Dec. 6, 1927.
E. E. GOLD
PIPE JOINT
Filed Nov. 20. 1924
1,651,522
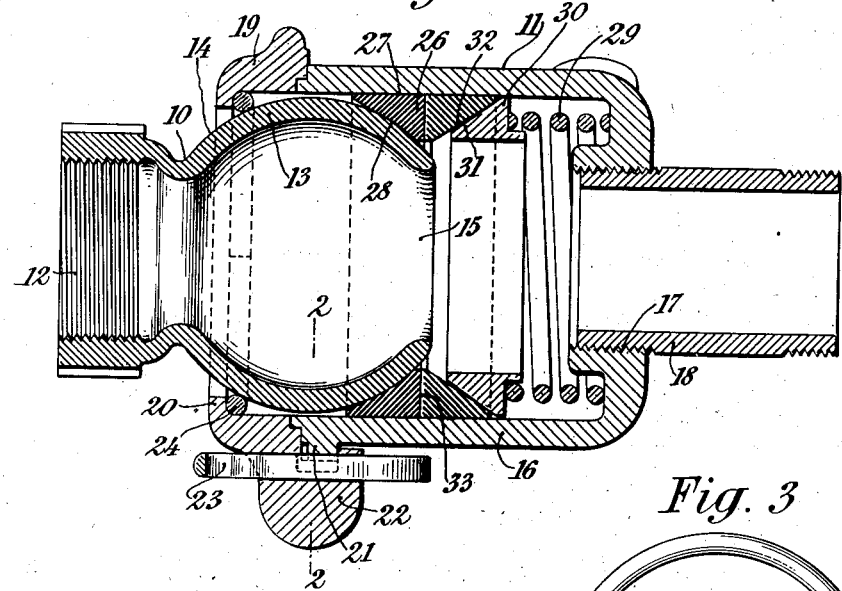
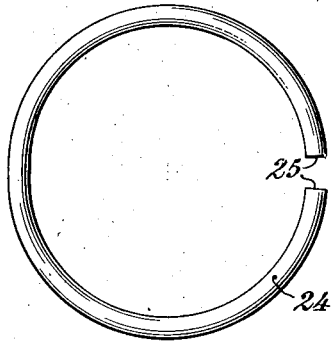
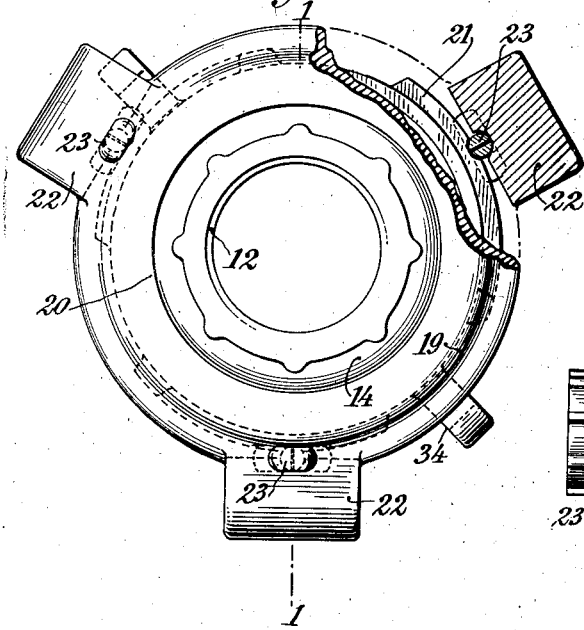
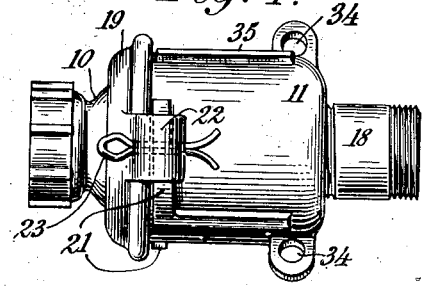
INVENTOR:
Edward E. Gold,
By Attorneys,
Fraser, Myers & Manley.

Patented Dec. 6, 1927.

1,651,522

UNITED STATES PATENT OFFICE.

EDWARD E. GOLD, OF NEW YORK, N. Y., ASSIGNOR TO GOLD CAR HEATING & LIGHTING COMPANY, OF BROOKLYN, NEW YORK, A CORPORATION OF NEW YORK.

PIPE JOINT.

Application filed November 20, 1924. Serial No. 750,978.

This invention relates to improvements in pipe joints of the universal type, and is well adapted for use in the end portions of railway train pipes to provide the necessary flexible or articulated terminals which facilitate the coupling and uncoupling of such pipes between the coaches.

It is an object of the invention to provide a relatively simple and durable packing which may be quickly removed and replaced when worn out. Another object of the invention is to provide a pipe joint which will offer a minimum degree of resistance to relative movement of its parts when flexed under steam pressure. A third object of the invention is to provide a pipe coupling the parts of which may be quickly separated and reassembled, for purposes of repair or renewal, without liability of accidental separation.

In the accompanying drawings illustrating the preferred form of the invention,—

Figure 1 is a longitudinal section, through a pipe coupling embodying the invention, along the line 1—1 of Fig. 2.

Fig. 2 is an end view of the same, parts being shown in cross section along the line 2—2 of Fig. 1.

Fig. 3 is a view of a ball retaining ring removed from the socket member of the coupling.

Fig. 4 is a reduced scale side view of the assembled coupling.

The invention as herein disclosed comprises a coupling of the ball and socket type, comprising a male or ball member 10 and a female or socket member 11.

The male member may comprise a pipe fitting threaded at one end as at 12 to receive a pipe coupling, and terminating at the opposite end in a ball-like portion 13 having a smooth spherical external surface 14. This ball-like element is open at the end 15 for the passage of fluid.

The female member of the coupling comprises a body portion 16 threaded at one end as at 17 to receive a pipe end 18. The opposite end of the female member of the coupling is provided with a separable retaining ring 19, having an inturned retaining flange 20 at its outer end for a purpose which will hereinafter be explained.

To provide for the attachment and detachment of the two parts of the socket member, the body portion is provided with a number of circumferentially disposed wedge-shaped lugs 21 spaced circumferentially about the same, and the retaining ring may be provided with a like plurality of hook-shaped elements 22 having inclined surfaces to engage and cooperate with the surfaces of the wedge-shaped elements 21. The two parts of the socket member may, therefore, be quickly assembled by an endwise movement sufficient to pass the ends of the hook-shaped elements between the ends of the wedge-shaped lugs, after which the parts of the fastening means may be brought into an interlocking relation by a slight relative rotation between the body portion of the socket member and the retaining ring.

If desired, means may be provided whereby the retaining ring and the body portion of the socket member may be locked in their clamped relation. This may be effected by the use of one or more cotter pins 23 passed through adjacent portions of the interlocked parts, aligned openings therein being provided in proper positions for such purpose.

When the pipe coupling is in service, the pressure of the contained fluid constantly tends to separate the two parts of the pipe joint by relative endwise movement, thus setting up opposed forces between the ball-shaped portion of the ball element and that part of the socket element by which it is retained in place. These forces have a tendency to prevent relative movement of the two parts of the joint. It is one purpose of this invention to reduce to a minimum such resistance to relative motion. With this object in view, it is the purpose of the invention to provide a ball element and retaining means each having smooth, convex, curved surfaces such as will always maintain an annular line contact. This may be effected by the use of a ball element of spherical form and an annular retaining member which affords a circular orifice the mouth or throat of which has an inwardly disposed, convex, curved surface. This curved surface might be a part of the retaining ring 19, but, as herein disclosed, comprises a polished ring 24, of circular cross section, retained in place by the flange 20 of the retaining ring 19. If desired, this ring may be of the split-ring type, as indicated in Fig. 3, of such dimensions as to have its ends 25 brought together when the ring 24 is inserted in the retaining ring.

The degree of friction may be further reduced by making the ring 24 and the ball element 10 of different materials. Preferably the ball element will be constructed of brass and the ring 24 of steel. It will be obvious that the ball element may, within limits, be moved in any desired direction relative to the socket element, during which a circular line contact will always be maintained between the ball-shaped portion 13 of the ball member and the ring 24 of the socket member.

A third feature of the invention comprises an improved packing to effect a fluid-tight joint between the ball member and the socket member. As indicated at 26, Fig. 1, this packing comprises an annulus of vulcanized asbestos fibre or other suitable moisture-proof and heat-resisting material, having an outer cylindrical surface 27 conforming with the inner surface of the socket member and a conical inner surface 28 adapted to make contact with the smooth spherical surface of the ball 13. Although packing of the character described is of the self-packing type, it is essential that it be maintained in its normal position when pressure is relieved. To this end, there is provided a spring 29 confined between the end of the socket member and a follower ring 30, of metal or other suitable material, preferably having a conical surface 31 in engagement with a rearwardly directed conical surface 32 of the packing.

If desired, the packing 27 may be constructed in two like parts and assembled back to back, the place of separation of such parts being indicated at 33.

The conical surface 31 of the follower ring should approximately conform with the conical surface 32 of the packing ring. In the preferred form of the invention, however, the surface 31 will be given a slightly greater degree of flare than the surface 32, as indicated in Fig. 1, whereby the pressure exerted by the spring 29 upon the follower ring will have a tendency to localize a wedging effect upon the thinner portion of the packing and tend to maintain the same in snug contact with the inner surface of the socket. The spring and follower ring also tend to maintain the ball 13 in its normal position in engagement with the polished ring 24, with the packing snugly wedged into the space between the ball and the socket.

When the pipe joint is subjected to fluid pressure, there is a constant tendency, irrespective of the spring 29, to maintain the packing in fluid-tight relation with the ball and socket. The spring need, therefore, be only of sufficient strength to hold the parts of the pipe joint in normal relation when not subjected to pressure.

If desired, the socket member may be provided with perforated ears 34, Fig. 4, whereby the jointed portion of the pipe may be suspended from some permanent part of the structure in association with which it is used. The socket member may also be provided with ribs 35 to facilitate the operation of assembling and disassembling of the parts of the pipe joint.

The foregoing pipe coupling is of relatively simple construction and may be readily assembled and disassembled for purposes of repair and renewal. The parts of the socket member may be quickly separated by removing the cotter pins and imparting a gentle tap to one or the other of the parts of the socket. The retaining ring 19 may then be removed by a partial rotation and endwise movement, thus permitting the ball and packing elements to be readily withdrawn. When the packing is made in the preferred form, comprising two rings in back-to-back relation as indicated, a leak resulting from overwear of one of said rings may be repaired either by supplying a new ring or by inverting the two, as circumstances may demand. After the interchange of parts or renewal has been effected, the ball member is again replaced and secured by an endwise application of the retaining ring followed by a slight rotation and tap of a hammer or other bar of metal to bring the parts into proper relative position for the insertion of the cotter pins.

In actual service, the single annulus of packing material between the ball and the socket has been found to give satisfactory service, and the line contact between the brass surface of the ball and the smooth curved surface of the polished steel ring provides an efficient anti-friction bearing affording a relatively small resistance to movement between the ball member and the socket member of the pipe joint when subjected to relatively high pressure.

The invention is not intended to be limited to specific features of the preferred form herein disclosed, but is intended to include modifications and variations thereof within the scope of the appended claims.

What is claimed is:

1. A universal pipe joint of the ball and socket type, comprising a ball member terminating in a ball having a smooth convex spherical outer surface, a socket member having retaining means to limit the movement of said ball in the direction of separation only, a fluid-tight packing of annular form having oppositely-disposed annular wedge-like portions defined by an external cylindrical surface conforming with the inner surface of the socket member and a pair of internal conical surfaces of gentle slope flaring outwardly from within said packing toward its ends, a follower ring for said packing, and a spring to maintain said packing with one of its ends wedged between said ball and the surface of said socket member and its other end wedged between said ring and said surface, whereby said packing is expanded into close contact with the surface of said socket member and said ball member is maintained in a normal position in contact with said retaining means but may be rotated about its longitudinal axis or swung through a limited degree of arc in any direction, the follower ring having a conical surface approximately conforming with that of the adjacent end of the packing but having a slightly greater degree of flare, whereby a wedging action may be localized between the follower ring and the thinner portion of the end of the packing engaged by said ring.

2. A flexible pipe joint of the ball and socket type comprising a ball member terminating in a brass ball having a smooth convex spherical outer surface, a socket member having a steel ball retaining portion of annular form affording a smooth convex curved surface in line contact with said ball, and a fluid-tight packing between the surface of said ball and said socket member.

3. A flexible pipe joint having relatively movable parts, an annular packing ring therefor having a portion of wedge-shaped cross-section bounded by surfaces one of which is conical, a follower ring of rigid material having a conical surface approximately conforming with that of the packing ring but having a slightly greater degree of flare, whereby a wedging action may be localized between the follower ring and the thinner portion of the packing ring, and a spring to maintain a constant wedge-effecting relationship between said packing ring and said follower ring.

4. A pipe joint of the ball and socket type comprising a ball member terminating in a brass ball having a smooth convex spherical outer surface, a socket member having an inturned flange at its open end, an annular polished steel ring of circular cross section housed within said socket member and retained in place by said flange, said ring forming a ball retaining element affording a line contact with said ball, and a fluid-tight packing between said ball and said socket member.

In witness whereof, I have hereunto signed my name.

EDWARD E. GOLD.